(12) United States Patent
Kousaka

(10) Patent No.: US 8,489,183 B2
(45) Date of Patent: Jul. 16, 2013

(54) BIOMETRIC APPARATUS

(75) Inventor: Hiroki Kousaka, Tokyo (JP)

(73) Assignee: Tanita Corporation, Tokyo (JP)

( * ) Notice: Subject to any disclaimer, the term of this patent is extended or adjusted under 35 U.S.C. 154(b) by 401 days.

(21) Appl. No.: 12/153,279

(22) Filed: May 15, 2008

(65) Prior Publication Data
US 2008/0306399 A1    Dec. 11, 2008

(30) Foreign Application Priority Data
May 18, 2007    (JP) .................................. 2007-133155

(51) Int. Cl.
A61B 5/05 (2006.01)
A61B 5/103 (2006.01)
A61B 5/117 (2006.01)

(52) U.S. Cl.
USPC .......................................... 600/547; 600/587

(58) Field of Classification Search
USPC .......................................... 600/547, 587, 595
See application file for complete search history.

(56) References Cited

U.S. PATENT DOCUMENTS

| | | | | |
|---|---|---|---|---|
| 4,799,558 A | * | 1/1989 | Griffen ...................... | 177/25.14 |
| 5,720,296 A | * | 2/1998 | Cha .............................. | 600/554 |
| 6,256,532 B1 | * | 7/2001 | Cha .............................. | 600/547 |
| 6,292,690 B1 | * | 9/2001 | Petrucelli et al. ............. | 600/547 |
| 6,473,643 B2 | * | 10/2002 | Chai et al. ...................... | 600/547 |
| 6,490,481 B1 | * | 12/2002 | Komatsu et al. ............... | 600/547 |
| 6,532,385 B2 | * | 3/2003 | Serizawa et al. ............... | 600/547 |
| 6,618,616 B2 | * | 9/2003 | Iijima et al. .................... | 600/547 |
| 6,843,109 B2 | * | 1/2005 | Nakada et al. ............... | 73/65.01 |
| 7,100,439 B2 | * | 9/2006 | Carlucci ......................... | 73/172 |
| 7,126,065 B2 | * | 10/2006 | Petrucelli ................... | 177/25.13 |
| 7,526,954 B2 | * | 5/2009 | Haselhurst et al. .............. | 73/172 |
| 8,204,710 B2 | * | 6/2012 | Walthert ....................... | 702/101 |

(Continued)

FOREIGN PATENT DOCUMENTS

| EP | 1 306 051 A1 | 5/2003 |
|---|---|---|
| EP | 1 705 467 A1 | 9/2006 |

(Continued)

OTHER PUBLICATIONS

European Search Report issued in European Patent Application No. EP 08007066.7 dated Sep. 2, 2008.

(Continued)

Primary Examiner — Sean P Dougherty
Assistant Examiner — Devin Henson
(74) Attorney, Agent, or Firm — McDermott Will & Emery LLP

(57) ABSTRACT

The invention provides a biometric apparatus which is able to determine the orientation of a measured person irrespective of the orientation of the measured person on the biometric apparatus or irrespective of the orientation of arrangement of the biometric apparatus and hence flow an electric current constantly through the same route and measure the voltage generated in the route, thereby providing accurate and reliable biometric data. The invention provides a biometric apparatus includes a plurality of weight measuring units provided on a casing for allowing a measured person to get on the upper surface thereof; a comparative determination unit for comparing measured values measured by the weight measuring units respectively and determining the orientation of the body of the measured person on the casing on the basis of the result of comparison; and a biometric data acquiring unit for acquiring a biometric data of the measured person on the basis of the result of determination by the comparative determination unit.

13 Claims, 3 Drawing Sheets

U.S. PATENT DOCUMENTS

| | | | |
|---|---|---|---|
| 2002/0002342 A1* | 1/2002 | Iijima et al. | 600/547 |
| 2003/0149375 A1* | 8/2003 | Chen | 600/547 |
| 2004/0251057 A1* | 12/2004 | Suzuki | 177/25.13 |
| 2005/0113712 A1* | 5/2005 | Petrucelli | 600/547 |

FOREIGN PATENT DOCUMENTS

| | | |
|---|---|---|
| JP | 60-261433 A | 12/1985 |
| JP | 62169023 | 7/1987 |
| JP | 5-49050 | 7/1993 |
| WO | WO 2004/051201 A2 | 6/2004 |

OTHER PUBLICATIONS

Japanese Office Action, and English translation thereof, issued in Japanese Patent Application No. 2007-133155 dated Jul. 2, 2012.

* cited by examiner

BIOMETRIC APPARATUS

RELATED APPLICATIONS

This application claims priority from Japanese Patent Application Serial No. 2007-133155, filed on May 18, 2007, the contents of which is hereby incorporated by reference in its entirety.

BACKGROUND OF THE INVENTION

1. Field of the Invention

The present invention relates to a biometric apparatus and, more specifically, to a biometric apparatus provided with a biometric data acquiring unit.

2. Description of the Related Art

In recent years, various biometric apparatuses which are able not only to weigh the weight of a measured person but also to calculate other biometric data such as the percent body fat, the percent body moisture and so on have been proposed. Such biometric apparatuses generally include four electrode members arranged on a cover member which configures an upper surface of a casing. The electrode members include two sets of conducting electrode and measuring electrode. When the measured person places his/her one foot on one set of the conducting electrode and the measuring electrode, and the other foot on the other set of the conducting electrode and the measuring electrode, respectively, measurement of the biometric data is carried out simultaneously with measurement of the weight. With the biometric apparatus of this type, since an electric current is applied from the two conducting electrodes which come into contact with the toes of the both feet of the measured person and the voltage is detected by the two measuring electrodes which come into contact with the heels, the four electrode members are placed at predetermined positions on the upper surface of the casing (Japanese examined patent application publication 5-49050).

However, with the biometric apparatus in the related art described above, there is a possibility to fail the accurate measurement when the measured person gets on the apparatus in an unexpected orientation. It is a case, for example, when an attempt is made to calculate the biometric data in a state in which the right foot is placed on the two conducting electrodes and the left foot is placed on the two measuring electrodes. In other words, although the measurement should be done by flowing the electric current between the tows of the both feet via both legs (lower body half) and measuring the voltage generated in this current route between the heels of the both feet, the current in this case flows between the toe and the heel of the right foot. Therefore, the voltage generated in this current route (right leg portion) cannot be measured between the toe and the heel of the left foot, and hence the bioimpedance cannot be measured.

There is a case in which the front, rear, left and right are not apparent depending on the appearance design of the biometric apparatus, and hence the measured person is confused in the orientation to get on. In addition, in the case of the biometric apparatus in which a measuring portion having the electrode members and a display portion are separate, being able to get on the measuring portion freely in any orientations is expected.

SUMMARY OF THE INVENTION

Accordingly it is an object of the invention to provide a biometric apparatus which is able to determine the orientation of a measured person irrespective of the orientation of the measured person on the biometric apparatus or irrespective of the orientation of arrangement of the biometric apparatus and hence flow an electric current constantly through the same route and measure the voltage generated in the route, thereby providing accurate and reliable biometric data.

In order to solve the problems described above, the invention provides a biometric apparatus including a casing for allowing a measured person to get on the upper surface thereof; a plurality of weight measuring units provided in the casing; a comparative determination unit for comparing measured values measured by the weight measuring units respectively and determining the orientation of the body of the measured person on the casing on the basis of the result of comparison; and a biometric data acquiring unit for acquiring the biometric data of the measured person on the basis of the result of determination by the comparative determination unit.

Preferably, the biometric data acquiring unit is a plurality of electrode members arranged on the upper surface of the casing, and includes a changeover unit for changing the function of the electrode members on the basis of the result of determination by the comparative determination unit.

Preferably, the plurality of electrode members is at least a pair of electrode members, and the changeover unit inverts the setting to determine one of the pair of electrode members as a conducting electrode for applying an electric current to a foot of the measured person and determine the other electrode member as a measuring electrode for detecting the voltage from the foot of the measured person alternately on the basis of the result of determination by the comparative determination unit.

Preferably, the comparative determination unit determines the side where a larger value is measured by the weight measuring unit to be the heel side of the measured person, and the changeover unit sets the electrode members provided on the side where the measured value is larger as the measuring electrode.

Preferably, the plurality of weight measuring units include four weight measuring units.

Preferably, the electrode members are provided at positions corresponding to the weight measuring units.

Preferably, the comparative determination unit divides the four weight measuring units into two pairs, and determines that the heels of the measured person are positioned on the side of the two electrode members corresponding to the weight measuring units indicating the larger measured values in the respective pairs.

Preferably, the weight measuring unit is a load cell.

Preferably, the casing is formed of positioning members for positioning the positions of the foot of the measured person on the upper surface thereof outside the plurality of electrode members.

Preferably, the electrode members have the same shape in plan view.

According to the embodiment of the invention, the biometric apparatus includes the plurality of weight measuring units provided on the casing for allowing the measured person to get on the upper surface thereof, the comparative determination unit for comparing the measured values measured by the weight measuring units respectively and determining the orientation of the body of the measured person on the casing on the basis of the result of comparison, and the biometric data acquiring unit for acquiring the biometric data of the measured person on the basis of the result of determination by the comparative determination unit. Accordingly, there is provided a biometric apparatus which is able to determine the orientation of the measured person irrespective of the orientation of the measured person on the biometric apparatus or irrespective of the orientation of arrangement of the biometric apparatus and hence flow an electric current constantly through the same route and measure the voltage generated in the route, thereby providing accurate and reliable biometric data. Furthermore, since the shapes of the electrode members and the casing which have been designed to lead the measured person to get on in the right orientation are not limited any longer, the biometric apparatus may range in design.

DESCRIPTION OF THE PREFERRED EMBODIMENTS

Figure 1:
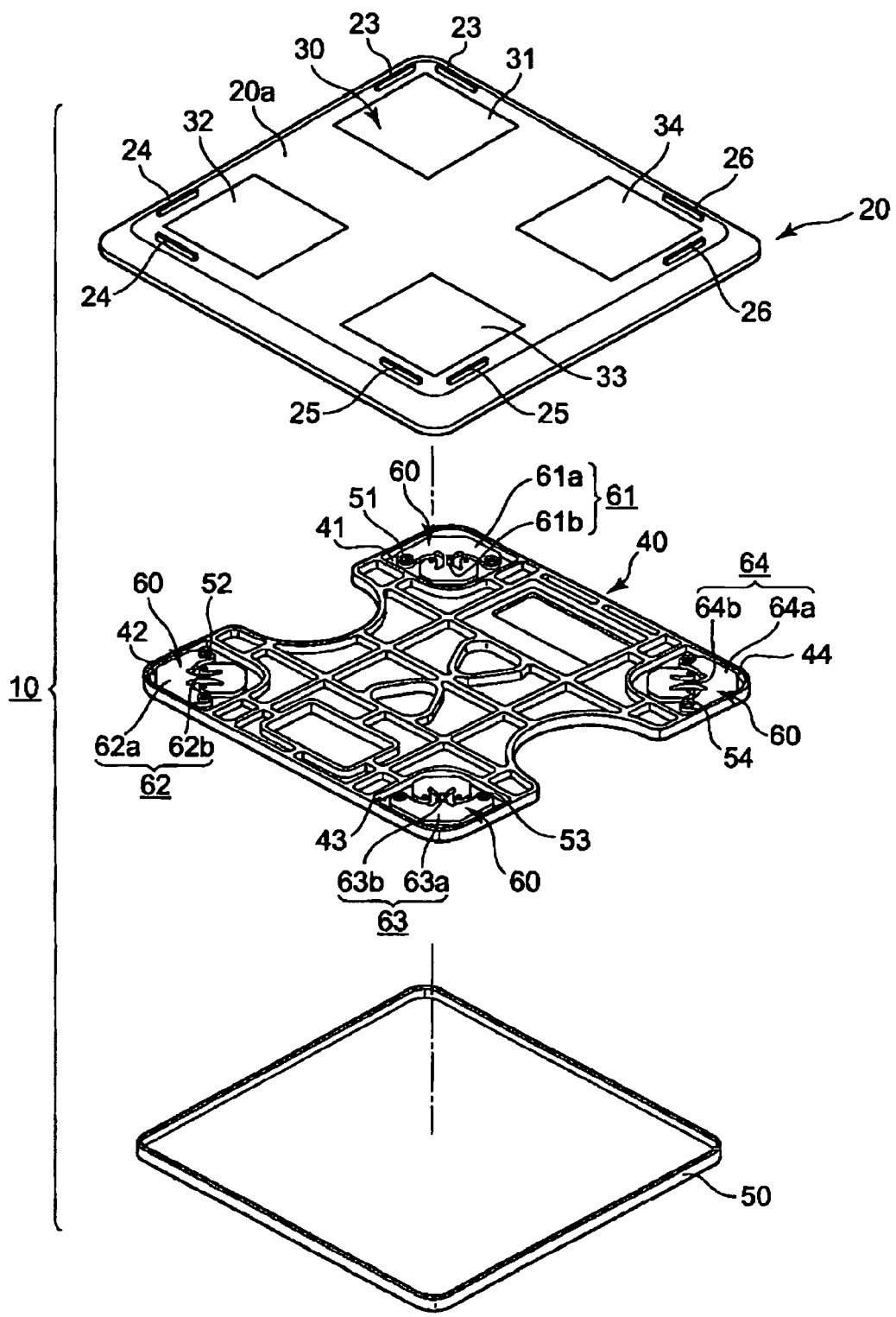
FIG. 1 is an exploded perspective view sowing a configuration of a biometric apparatus according to an embodiment of the invention.
Figure 2:
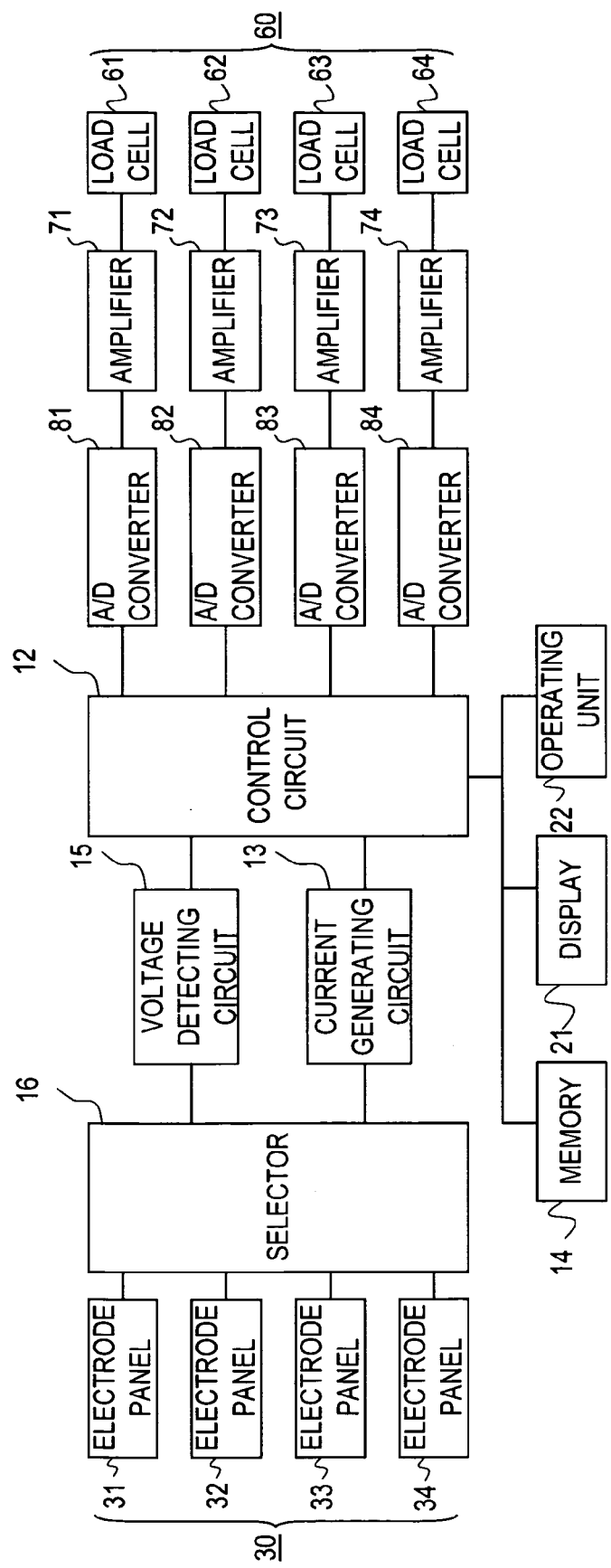
FIG. 2 is a block diagram showing a control system relating to the weight measurement and the acquisition of a biometric data of the biometric apparatus according to the embodiment of the invention.

Referring now to the drawings, an embodiment in which the invention is applied to a biometric apparatus 10 having four electrode panels 31, 32, 33, 34 on a cover member 20 and four load cells 61, 62, 63 and 64 will be described in detail. FIG. 1 is an exploded perspective view showing a configuration of the biometric apparatus 10 according to the embodiment and FIG. 2 is a block diagram showing a control system relating to the weight measurement and the acquisition of a biometric data of the biometric apparatus 10. The invention may be applied to configuration other than that shown in the embodiment.

As shown in FIG. 1 and FIG. 2, the biometric apparatus 10 includes the cover member 20 and a bottom plate member 50 which constitute a casing, an electrode member 30 as a biometric data acquiring unit, a load cell 60 as a weight measuring unit, and a control circuit 12 as a comparative determination unit, and is adapted to be able to carry out the acquisition of the biometric data using the electrode member 30 and the weight measurement by the load cell 60 simultaneously. The biometric apparatus 10 is configured by placing a frame member 40 having the load cell 60 fixed thereto on the bottom plate member 50 and placing the cover member 20 holding the electrode member 30 thereon on the frame member 40. The configuration of the each member will be described in detail.

The cover member 20 is a substantially square plate-shaped member formed by molding with resin (for example, ABS resin (acrylonitril/butadiene/styrene copolymer)), and holds the electrode member 30 on an upper surface 20a thereof. The structure for holding the electrode member 30 may be selected as needed. For example, the electrode member 30 may be held by forming recesses (not shown) on the upper surface 20a of the cover member 20 for accommodating the electrode member 30 and fitting the electrode member 30 therein so as to be flush with the upper surface 20a (see FIG. 1). In the embodiment, a display 21 and an operating unit 22 (FIG. 2) are provided separately from the cover member 20. However, these members may be provided integrally with the cover member 20.

As shown in FIG. 2, the display 21 and the operating unit 22 are connected to the control circuit 12. A memory (for example, RAM (Random Access Memory)) 14 is connected to the control circuit 12, so that the measured person of the biometric apparatus 10 is able to enter his/her own personal data (for example, the height, the sex and the age) by operating the operating unit 22 and store the data in the memory 14. The operating unit 22 is adapted to be able to read out the data from the memory 14 and display the data on the display 21, to select one of measurement mode stored in the memory 14 in advance, and to display the results of measurement in sequence.

The load cells 61, 62, 63 and 64 are connected to the control circuit 12 as the comparative determination unit via A/D converting circuits 81, 82, 83 and 84 and amplifiers 71, 72, 73 and 74 as amplifier circuits, respectively. The electrode panels 31, 32, 33 and 34 are also connected to the control circuit 12 via a current generating circuit 13 and a voltage detecting circuit 15, and a selector (selector circuit) 16 as a changeover unit.

The current generating circuit 13 is adapted to generate a constant current to be supplied from the electrode members set as the conducting electrodes to the toes of the measured person. The voltage detecting circuit 15 is adapted to acquire a potential (voltage) between both feet of the measured person generated by the electric current supplied from the current generating circuit 13 via the electrode members set as the measuring electrodes and detect the amount of voltage. The selector 16 is adapted to supply the electric current supplied from the current generating circuit 13 to the electrode members set as the conducting electrodes on the basis of the results of determination by the control circuit 12 as the comparative determination unit and connect the two electrode members set as the measuring electrodes to the voltage detecting circuit 15 for detecting the potential.

The control circuit 12, the current generating circuit 13, the memory 14, the voltage detecting circuit 15, the amplifiers 71, 72, 73 and 74 and the A/D converting circuits 81, 82, 83 and 84 may be arranged at desired positions of the biometric apparatus 10, for example, on the lower surface of the cover member 20 or the upper surface of the frame member 40, although not shown in the drawings except for FIG. 2.

The electrode member 30 includes four metallic electrode panels 31, 32, 33 and 34. The four metallic electrode panels 31, 32, 33 and 34 preferably have the same shape and the same feature so as to be capable of applying an electric current to a living body (measured person) coming into contact therewith, or detecting the voltage. The electrode panels 31, 32, 33 and 34 are arranged at four corners of a substantially square planar shape of the cover member 20. When the measured person places his/her toes and heels of both feet on the four electrode panels 31, 32, 33 and 34, the measurement of the weight is started, and then acquisition of the biometric data is carried out.

The cover member 20 is provided with projections 23, 24, 25 and 26 as positioning members on the plane of the upper surface 20a so as to project upward along two sides outside the electrode panels 31, 32, 33 and 34, respectively. With the provision of the projections 23, 24, 25 and 26, the correct placement of the toes and the heels of the measured person on the electrode panels 31, 32, 33 and 34 is ensured, whereby constant acquisition of the reliable and correct biometric data is ensured. The projections 23, 24, 25 and 26 may be arranged in an arbitrary shape, at arbitrary positions, and by an arbitrary number as long as they project upward at the electrode panels 31, 32, 33 and 34.

The frame member 40 is a plate-shaped member having a shape corresponding to the cover member 20, and is formed of a high-strength material such as metal (aluminum, for example). Mounting recesses 41, 42, 43 and 44 as recesses for accommodating the load cell 60 are formed at four corners of the upper surface (the surface on the side of the cover member 20) of the frame member 40, respectively. The mounting recesses 41, 42, 43 and 44 may be formed in the arbitrary shape at arbitrary positions of the frame member 40 corresponding to the configuration of the load cell 60. The frame member 40 may be formed of a material other than the metal (ABS resin, for example) as long as sufficient strength is ensured in terms of the specification of the biometric apparatus 10.

The bottom plate member 50 is a plate-shaped metal (aluminum, for example) member provided with a flat shape corresponding to the cover member 20, and constitutes the casing of the biometric apparatus 10 in association with the cover member 20. The casing may be of a configuration other than the configuration composed of the cover member 20 and the bottom plate member 50 as the biometric apparatus 10 in the embodiment.

The load cell 60 as the weight measuring unit includes load cells 61, 62, 63 and 64 to be accommodated in the mounting recesses 41, 42, 43 and 44 of the frame member 40, which all have the same shape and feature. The load cells 61, 62, 63 and 64 are formed by providing strain measuring members 61b, 62b, 63b and 64b as strain gauges on metallic distortable members 61a, 62a, 63a and 64a which is distorted by being applied with a load respectively, and are arranged so as to be oriented toward the center of the planar shape of the frame member 40, respectively. The load cells 61, 62, 63 and 64 are accommodated and fixed to the inside the mounting recesses 41, 42, 43 and 44 of the frame member 40 by screws 51, 52, 53 and 54, respectively to constitute flexure beams. The strain measuring members 61b, 62b, 63b and 64b each includes, for example, a pair of strain gauges, which constitute a part of Wheatstone bridge, for understanding the expansion and contraction of the each strain measuring member of the load cells 61, 62, 63 and 64 caused by the weight of the measured person to be the change in value of electric resistance, whereby the weight of the measured person is calculated. The calculation is carried out by the control circuit 12.

Figure 3:
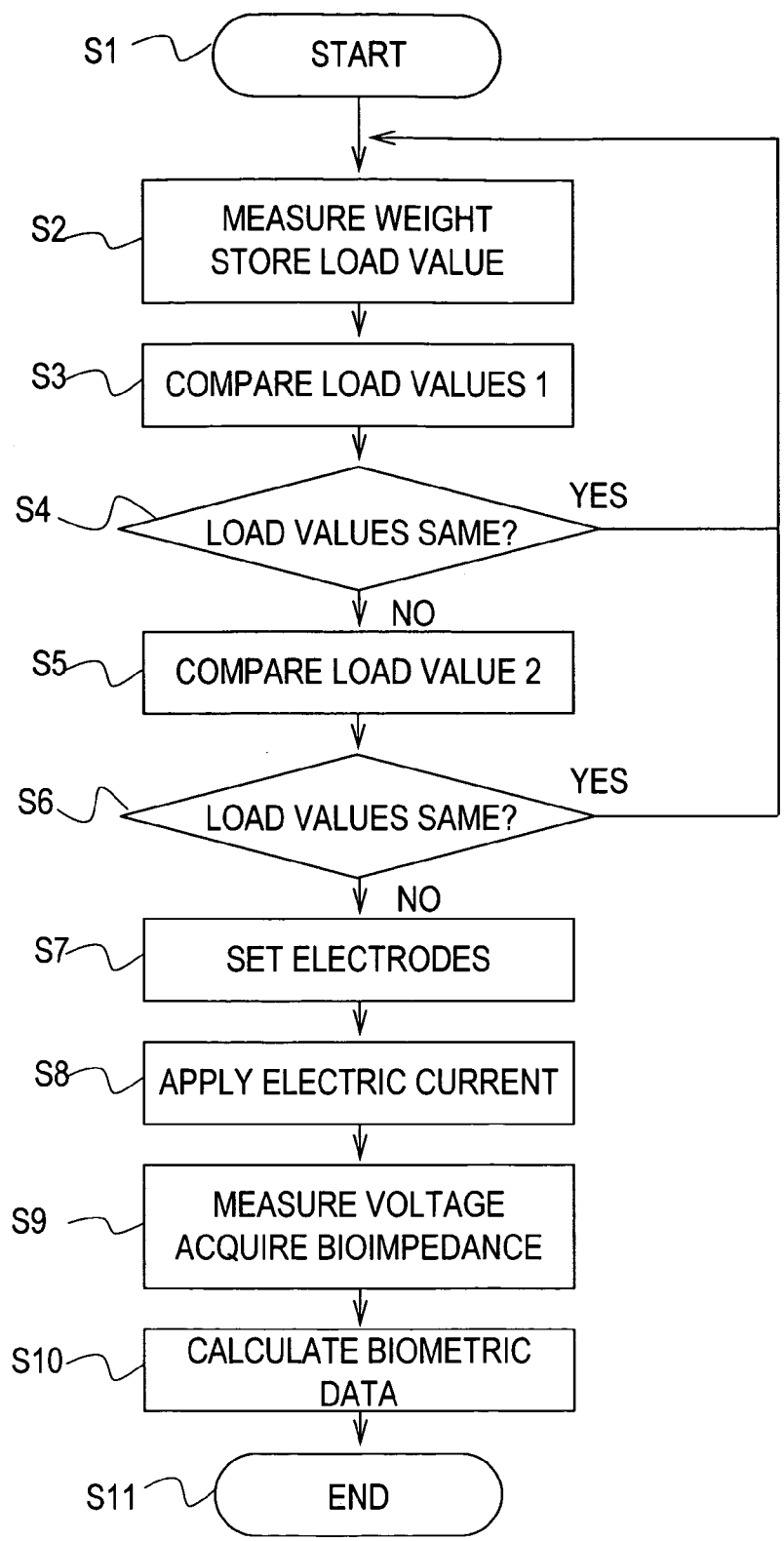
FIG. 3 is a flowchart showing a flow of the weight measurement and the acquisition of the biometric data using the biometric apparatus according to the embodiment of the invention.

Referring now to FIG. 3, a flow of the weight measurement and acquisition of the biometric data by the biometric apparatus 10 will be described. FIG. 3 is a flowchart showing the flow of the weight measurement and the acquisition of the biometric data using the biometric apparatus 10.

The biometric apparatus 10 is activated when the measured person gets on the cover member 20 or operates the operating unit 22 (Step S1), and the weight measurement starts when the measured person places his/her toes and heels of both feet on the electrode panels 31, 32, 33 and 34 (Step S2).

In the weight measurement, the values of resistance corresponding to the expansion or contraction of the strain measuring members of the load cells 61, 62, 63 and 64 caused on the basis of the loads applied thereto by the measured person getting on the cover member 20 are converted into voltage values via the Wheatstone bridge circuits, and the voltage values, after having been amplified by the amplifiers 71, 72, 73 and 74 respectively, are digitized by the A/D converting circuits 81, 82, 83 and 84, and are entered to the control circuit 12, respectively. The control circuit 12 calculates the entered voltage values as the load values applied to the load cells 61, 62, 63 and 64 using a calculation program stored in advance in the memory 14, respectively, and stores in the memory 14 in one-to-one correspondence with the load cells. The control circuit 12 calculates the weight of the measured person from the load values using the calculation program stored in advance in the memory 14.

On the other hand, the control circuit 12 compares the load values corresponding to the load cells 61, 62, 63 and 64 stored in the memory 14, and determines the orientation of the measured person on the cover member 20 (Step S3 to S5). This determination is done by determining the side applied with a larger load from among the four sides of the plane of the cover member 20 as the portion where the heels of the measured person are placed. In other words, it is generally considered that when a person stands upright in a natural posture, the load (the weight) is applied more to the heels than to the toes. Therefore, it is determined that the heels of the measured person are placed on the two adjacent load cells (electrode panels) showing a larger value from among the load cells 61, 62, 63 and 64 (electrode panels 31, 32, 33 and 34), and the toes are placed on the remaining two adjacent load cells (electrode panels). For example, the comparison of the load values and the determination of the orientation of the measured person are carried out as follows.

Firstly, the load values applied to the load cell 61 and the load cell 63 corresponding to the electrode panel 31 and the electrode panel 33 arranged at corners at opposite angles of the plane of the cover member 20 are compared (Step S3). When the both load cells are the same (Yes in Step S4), the weight measurement is carried out again to store new load values in the memory 14 (Step S2).

When the load values are not the same (No in Step S4), the electrode panel corresponding to the larger load value is stored in the memory 14, and then the load values at the load cell 62 and the load cell 64 corresponding to the electrode panel 32 and the electrode panel 34 arranged at different corners at opposite angles of the plane of the cover member 20 are compared (Step S5). When the both load values are the same (YES in Step S6), the weight measurement is carried out again to store new load values in the memory 14 (Step S2).

When the both load values are not the same (NO in Step S6), the electrode panel corresponding to the larger load value is stored in the memory 14. With the operation shown above, a pair of the electrode panels corresponding to a pair of the load cells showing the larger load values are stored in the memory 14, and the control circuit 12 determines that the heels of the measured person are placed on the pair of stored adjacent electrode panels and the toes are placed on the remaining pair of adjacent electrode panels. Furthermore, when the electrode panels corresponding to the heels and the toes of the measured person, the arrangement of the both feet of the measured person on the cover member 20 is specified and hence the orientation of the body (the orientation of the feet) of the measured person is specified. The control circuit 12 sets the two electrode panels corresponding to the toes of the measured person as the conducting electrodes for applying the electric current and the two electrode panels corresponding to the heels as the measuring electrodes for detecting the voltage, respectively, and outputs the result of setting to the selector 16 (Step S7). It is also possible to set the electrode panels on the toe side of the measured person as the measuring electrodes and the electrode panels on the heel side as the conducting electrodes.

The selector 16 applies alternating current outputted from the current generating circuit 13 to the two electrode panels set as the conducting electrodes from among the electrode panels 31, 32, 33 and 34 (Step S8), and starts measurement of the voltage value (potential difference) between the two electrode panels set as the measuring electrodes (Step S9).

The measurement of the voltage value is carried out by the voltage detecting circuit 15 connected to the measuring electrodes via the selector 16. The measured voltage value is stored in the memory 14, and the control circuit 12 calculates the bioimpedance (bioelectric impedance) between both feet of the measured person from the current value supplied from the conducting electrodes and the measured voltage value according to the program stored in the memory 14 in advance. The control circuit 12 is also able to calculate, for example, the percent body fat, the percent body moisture, the muscle mass, the basal metabolic rate, the bone mass, and the offal fat level as the biometric data from the weight calculated using the load cell 60 and the bioimpedance calculated using the electrode member 30 according to the program stored in the memory 14 in advance (Step S10). The calculated weight and the biometric data are displayed on the display 21 and the entire measurement process is ended (Step S11).

Modifications will be described below. In the flow of biometric data acquisition described above, the load values at the load cells at the corners at opposite angles are compared, the electrode panels corresponding to the load cells which show the larger load values are determined to be under the heels of the measured person, and then these electrode panels are set as the conducting electrodes. However, it is also possible to employ a comparative determination method instead, which includes steps of comparing the load values of all the load cells and setting the electrode panels corresponding to the load cells showing the larger two load values as the conducting electrodes.

Alternatively, it is also possible to employ two electrode panels instead of the four electrode panels 31, 32, 33 and 34 described above. In this case, both of these two electrode panels are provided with functions of the conducting panel and the measuring panel, so that when conducting from one electrode panel to the other electrode panel in a state in which the left foot of the measured person is placed on one of these electrode panels and the right foot of the measured person on the other electrode panel, the bioelectric impedance is obtained on the basis of the result of measurement of the voltage between the both electrode panels. In this configuration, when the toe and the heel of the same foot is placed on the both electrode panels, the current route via the legs (lower body half) of the measured person is not formed, and hence the accurate bioimpedance cannot be calculated. Therefore, the invention is applied to this configuration, so that whether the measured person is on the electrode panels in the orientation which enables measurement of the bioimpedance or not can be determined. The invention is also applicable to the biometric apparatus provided with a height measuring apparatus of a type which measures the height of the measured person by bringing a measuring terminal which is movable in the vertical direction into contact with the parietal region of the measured person, and the case in which two electrode panels are provided as in the case shown above is preferable in that determination of the orientation of the measured person between the posture with his/her front side toward the height measuring apparatus and the posture with his/her back toward the height measuring apparatus is easily made.

It is preferable to arrange the load cells one each at four corners of the frame member 40 as described above from the view point of determining the orientation of the measured person accurately. However, determination of the orientation of the measured person on the cover member 20 is achieved with at least two load cells with a simple and cost effective configuration.

It is also possible to configure the electrode panels in a mode other than the four metallic electrode panels. For example, it is also possible to provide a plurality of reference resistances having known different values of resistance in the control circuit 12 in series or in parallel to the body of the measured person, acquire the potential generated because of the respective reference resistances in association with the potential generated between the feet, and calculate the bioimpedance of the measured person on the basis of the ratio between the respective acquired potentials and the values of resistance of the reference resistances. In this case, a configuration with the two metallic electrode panels is applicable. In this configuration, even when the current value supplied to the body is unknown, the bioimpedance data can be obtained.

In the embodiment shown above, the current generating circuit 13 and the voltage detecting circuit 15 are selectively connected to the conducting electrodes and the measuring electrodes using the selector 16. Alternatively, it is also possible to arrange, for example, a rotatable electrode switching member in a plane parallel to the cover member 20 in the casing, and connect the current generating circuit 13 to the electrode panel to be set as the conducting electrode and the voltage detecting circuit 15 to the electrode panel to be set as the measuring electrode, respectively.

In the embodiment shown above, a set of the current generating circuit 13 and the voltage detecting circuit 15 is selectively connected to the four electrode panels using the selector 16. Alternatively, it is also possible to connect the set of the current generating circuit and the voltage detecting circuit to each of the four electrode panels and instruct which one of the current generating circuit and the voltage detecting circuit for the respective electrode panels are to be used according to the results of determination by the control circuit 12.

What is claimed is:

1. A biometric apparatus comprising:
   a casing for allowing a person to get on a surface thereof;
   a plurality of weight measuring units provided in the casing;
   a biometric data acquiring unit including a plurality of electrode members arranged on the casing; and
   a comparative determination unit that determines an orientation of a foot of the person by comparing a value measured by at least one of the plurality of weight measuring units with a value measured by at least another one of the plurality of weight measuring units, and sets at least one of the plurality of electrode members as a measuring electrode and at least another one of the plurality of electrode members as a conducting electrode based on the determined orientation of the foot.

2. The biometric apparatus of claim 1, wherein the conducting electrode applies an electric current to a foot of the person and the measuring electrode detects a voltage from a foot of the person.

3. The biometric apparatus of claim 1, further comprising a changeover unit that connects the at least one of the plurality of electrode members set as the measuring electrode to a voltage detecting circuit and that connects the at least another one of the plurality of electrode members set as the conducting electrode to a current generating circuit.

4. The biometric apparatus of claim 1, wherein the comparative determination unit determines that a heel of the person is placed on a side where at least one of the plurality of weight measuring units measures a value larger than a value measured by at least another one of the plurality of weight measuring units.

5. The biometric apparatus of claim 4, wherein the comparative determination unit sets at least one of the plurality of electrode members, located on the side where the heel of the person is determined to be placed, as the measuring electrode.

6. The biometric apparatus of claim 1, wherein the comparative determination unit sets at least one of the plurality of electrode members, located on a side where at least one of the plurality of weight measuring units measures a value larger than a value measured by at least another one of the plurality of weight measuring units, as the measuring electrode.

7. The biometric apparatus of claim 1, wherein the comparative determination unit sets at least one of the plurality of electrode members, located on a side where a heel of the person is determined to be placed, as the measuring electrode.

8. The biometric apparatus of claim 1, wherein the comparative determination unit sets at least one of the plurality of electrode members, located on a side where a toe of the person is determined to be placed, as the conducting electrode.

9. The biometric apparatus of claim 1, wherein the comparative determination unit sets the measuring electrode and the conducting electrode after the person gets on the casing.

10. The biometric apparatus of claim 1, wherein at least one of the plurality of weight measuring units includes a load cell.

11. The biometric apparatus of claim 1, further comprising positioning members disposed on the surface of the casing and outside the plurality of electrode members, the positioning members being arranged to guide the positioning of a foot of the person when getting on the casing.

12. The biometric apparatus of claim 1, wherein the plurality of electrode members have the same shape in plan view.

13. The biometric apparatus of claim 1, wherein the comparative determination unit compares values measured by at least two of the plurality of weight measuring units which are diagonally arranged to each other.

\* \* \* \* \*